(12) United States Patent
Goldshteyn

(10) Patent No.: US 8,267,347 B2
(45) Date of Patent: Sep. 18, 2012

(54) WINGING CAR

(76) Inventor: Yan Goldshteyn, Los Angeles, CA (US)

( * ) Notice: Subject to any disclaimer, the term of this patent is extended or adjusted under 35 U.S.C. 154(b) by 1282 days.

(21) Appl. No.: 11/656,041

(22) Filed: Jan. 22, 2007

(65) Prior Publication Data

US 2010/0270417 A1    Oct. 28, 2010

(51) Int. Cl.
- B64C 37/00 (2006.01)
- B64C 3/56 (2006.01)
- B64C 9/34 (2006.01)

(52) U.S. Cl. .................... 244/2; 244/49; 244/87

(58) Field of Classification Search ............ 244/2, 46, 244/49, 87
See application file for complete search history.

(56) References Cited

U.S. PATENT DOCUMENTS

| | | | | |
|---|---|---|---|---|
| 2,110,563 A * | 3/1938 | Thaon | | 244/17.11 |
| 2,561,291 A * | 7/1951 | Rethorst | | 244/50 |
| 2,562,490 A * | 7/1951 | Hall | | 244/2 |
| 2,713,465 A * | 7/1955 | Novinger | | 244/2 |
| 2,767,939 A * | 10/1956 | Taylor | | 244/2 |
| 2,811,323 A * | 10/1957 | Rethorst | | 244/2 |
| 2,893,661 A * | 7/1959 | Aylor | | 244/36 |
| 2,923,494 A * | 2/1960 | Strong | | 244/2 |
| 2,940,688 A * | 6/1960 | Bland | | 244/2 |
| 3,012,737 A * | 12/1961 | Dodd | | 244/2 |
| 3,029,042 A * | 4/1962 | Martin | | 244/2 |
| 3,065,927 A * | 11/1962 | Mills | | 244/2 |
| 3,083,936 A * | 4/1963 | Rethorst | | 244/49 |
| 3,090,581 A * | 5/1963 | Einarsson | | 244/2 |
| 3,322,223 A * | 5/1967 | Bertelsen | | 180/120 |
| 3,371,886 A * | 3/1968 | Schertz | | 244/2 |
| 3,599,901 A * | 8/1971 | Relkin | | 244/12.3 |
| 4,165,846 A * | 8/1979 | Groeger | | 244/2 |
| 4,269,374 A * | 5/1981 | Miller | | 244/2 |
| 4,358,072 A * | 11/1982 | Williamson | | 244/2 |
| 4,579,297 A * | 4/1986 | Ayoola | | 244/2 |
| 4,627,585 A * | 12/1986 | Einstein | | 244/2 |
| 4,881,700 A * | 11/1989 | Sarh | | 244/2 |
| 4,899,954 A * | 2/1990 | Pruszenski, Jr. | | 244/2 |
| 4,913,375 A * | 4/1990 | Fitzpatrick | | 244/2 |
| 5,050,817 A * | 9/1991 | Miller | | 244/2 |
| D331,893 S * | 12/1992 | Szakacs | | D12/4 |
| 5,435,502 A * | 7/1995 | Wernicke | | 244/2 |
| 5,984,228 A * | 11/1999 | Pham | | 244/2 |
| 6,086,014 A * | 7/2000 | Bragg, Jr. | | 244/2 |
| 6,224,012 B1* | 5/2001 | Wooley | | 244/2 |
| 6,517,026 B1* | 2/2003 | Smith | | 244/2 |
| 6,619,584 B1* | 9/2003 | Haynes | | 244/2 |
| 6,786,450 B1* | 9/2004 | Einstein | | 244/2 |

* cited by examiner

Primary Examiner — Joseph W Sanderson

(57) ABSTRACT

A road driving and flight vehicle is able to automatically convert between two configurations to facilitate operations as an automobile and as an aircraft. In the flight configuration the craft includes two jet engines at a rear body part, two wings with ailerons produced by open/flap upwardly doors where the upper end is hinged to a body and bottom end raised up to place wings horizontally, and a vertical stabilizer with rudder and two horizontal stabilizers with elevators. In the road driving configuration vehicle includes conventional automobile power plant in the front part of the body, four wheels of which two front wheels are steerable, two doors, and a vertical and two horizontal stabilizers are stored at a rear part of the body.

7 Claims, 9 Drawing Sheets

WINGING CAR

REFERENCE TO SEQUENCE LISTING, A TABLE, OR A COMPUTER PROGRAM LISTING COMPACT DISC APPENDIX

Not Applicable

BACKGROUND OF THE INVENTION

The practical need for a vehicle that could be flown and driven on roadways has a long history but in the current century it is becoming a necessary feature because of limited capacity of streets and highways. The barrier to achieving success is located in the necessity to match different characteristics during the flight and driving operations. In order to overcome the challenging design requirements, the vehicle should have an ability to simply and alternately convert between an aircraft and automobile configurations and have a speedy take-off. Although, no vehicles are being commercially manufactured to successfully resolve the tasks.

One technical proposition, U.S. Pat. No. 2,767,939, comprises a structure of an automobile or cabin assembly with an aircraft assembly, which is removable and towed behind for the road use. The aircraft assembly cannot be folded or stowed for the driving operations and a single gasoline engine is impractical for a speedy take-off. This is one of only two road/air vehicle or flying car designs ever certified for production by CAA (Civil Aeronautics Administration) or FAA (Federal Aviation Administration).

U.S. Pat. No. 2,940,688 has a lifting body configuration somewhat in the manner of the airfoil fuselage shape. However, the rear fuselage includes a central channel before the rear propeller, somewhat in the manner of one nacelle or channel of the twin engine Custer Channel Wing aircraft developed in the 1950s. The craft utilizes two engines, one for driving and water use and other for airborne use. However, the two engines are of similar design and may be linked together to provide the required power for take-off and climb when used as an aircraft. This arrangement has flight components that cannot be folded or stowed for the driving or water operations, and unlikely to make take-off in a short distance by using a propeller.

U.S. Pat. No. 4,165,846 has a land-air-water vehicle with doors which open to become wings and a large diameter set of tires which acts to assist in both land and water propulsion. Unlike the current invention, this arrangement has unwindable fins for control, wings components that require a complex structure in order to set them into a working position, and utilize motors/generators for all operations which cannot provide for a speedy take-off by using propellers.

U.S. Pat. No. 4,269,374 has the wings, tail assembly and propeller drive all folded into the structure of the body or cabin portion for carriage during road use and non-driven rear wheels that are capable of inward articulation to provide room for the wings when folded. This arrangement has a complicated way of stowing all parts for driving operation and utilizes a single engine for driving and flight operations that are impractical for a speedy take-off.

U.S. Pat. No. 6,619,584 has front canard wings, main wings with fins assembly that can all be folded into structure of the body or cabin portion for carriage during road use, as well as non-driven rear wheels. The two engines are used separately for driving and flight operations. This arrangement requires a complex method for stowing all parts, a special compartment for stowing wings for the driving operation and has to be manually arranged, unlike the current invention.

BRIEF SUMMARY OF THE INVENTION

The present invention comprises of a road driving and flight vehicle that automatically can be changed from one configuration to another and provide a fast take-off. The essential features of the invention are doors that open/flap as wings and jet engines mounted at a rear of the body.

The automatic conversion from road driving to flight arrangement is constructed through opening two doors upwardly, right and left, as wings with upper end hinged at the body and bottom end raised up approximately by 90 degrees to place wings in a horizontal position. The vertical and left and right horizontal stabilizers, located at a rear body part, automatically extend from stored positions/compartments to the flight positions. The aviation controls are assured with wings' ailerons, vertical stabilizer's rudder, two horizontal stabilizers' elevators and two jet engines mounted at a rear body part for forward thrust.

A conventional automobile engine with an automatic transmission is located at the front body part and arranged for road driving operations on which it drives and steers two front wheels of four wheels.

DETAILED DESCRIPTION OF THE INVENTION

The present invention comprises an automobile based vehicle that may be driven on the road and also flown as an aircraft.

Figure 1:
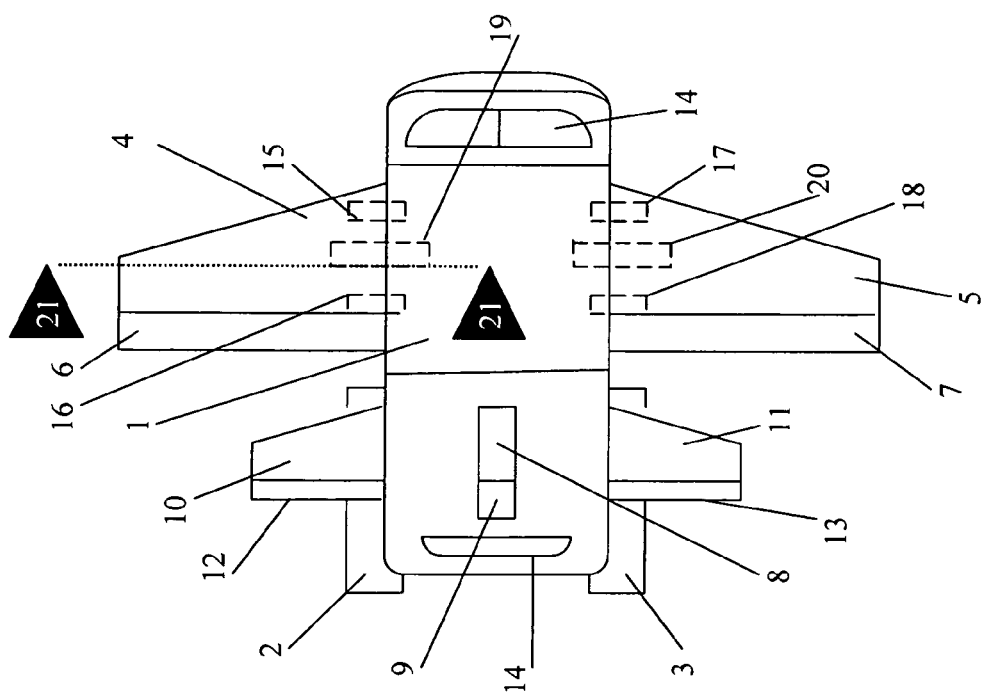
FIG. 1 is a view from the above in flight operation.

The drawings on FIG. 1 show the top view for flying configuration. The elements on FIG. 1 comprise body structure 1, two jet engines 2 and 3, wings-doors 4 and 5 in open or flying arrangements with ailerons 6 and 7, vertical stabilizer 8 with a rudder 9, two horizontal stabilizers 10 and 11 with elevators 12 and 13 and observe windows 14. Wings-doors have hinges 15, 16, 17 and 18 that allow wings to be opened upwardly and extendable shafts 19 and 20 to lift up wings-doors. Location of cross section position is shown as 21-21. The phrase "wings-doors" means doors that serve as wings or vise versa.

Figure 2:
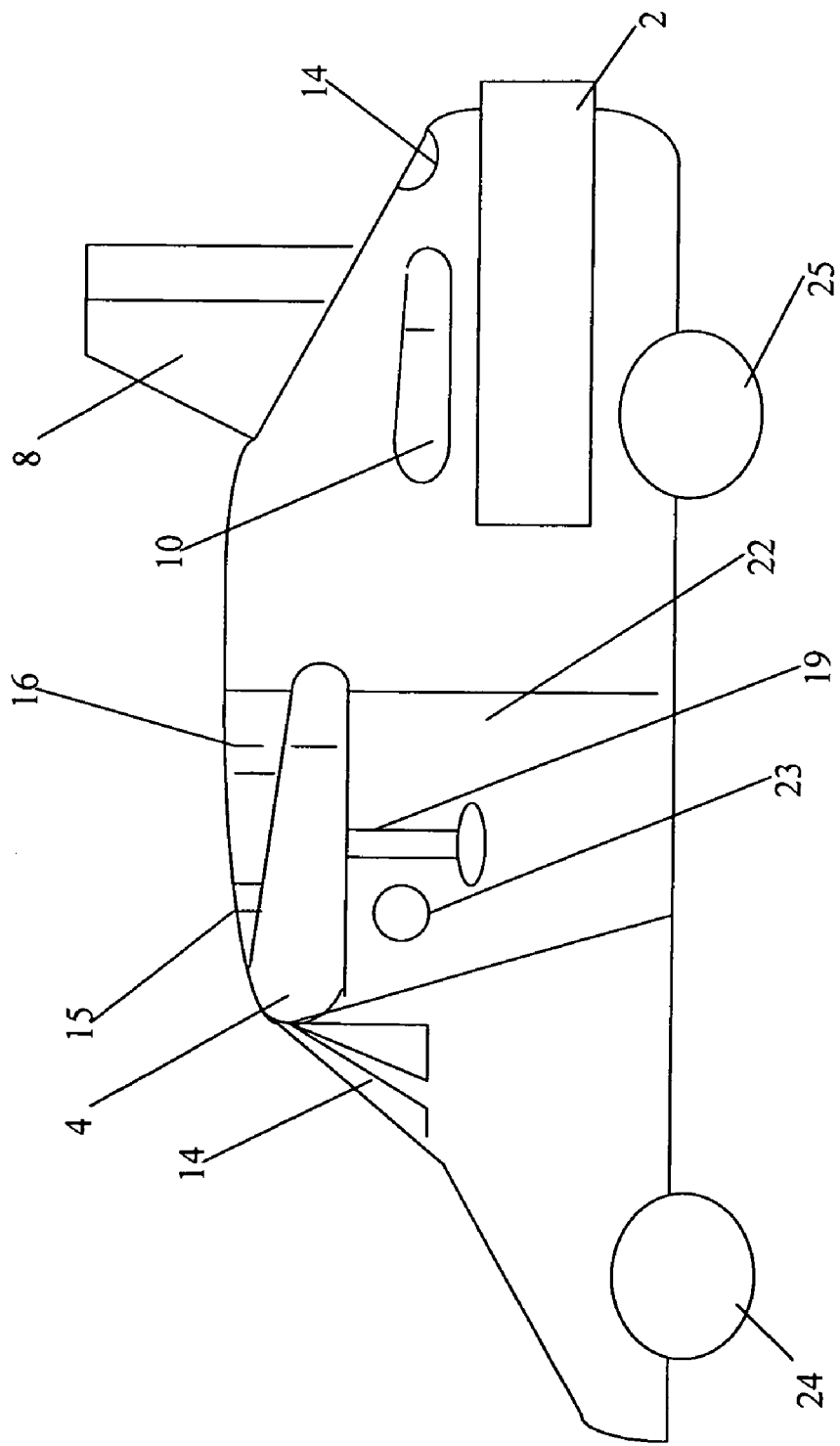
FIG. 2 is a view from the left side in flight operation.

The drawings on FIG. 2 show the side view for flying configuration. The additional elements on FIG. 2 comprise a left protective shield 22 for a cabin or body structure with a transparent part or window 23, front 24 and rear 25 wheels. The right protective shield is identical.

Figure 3:
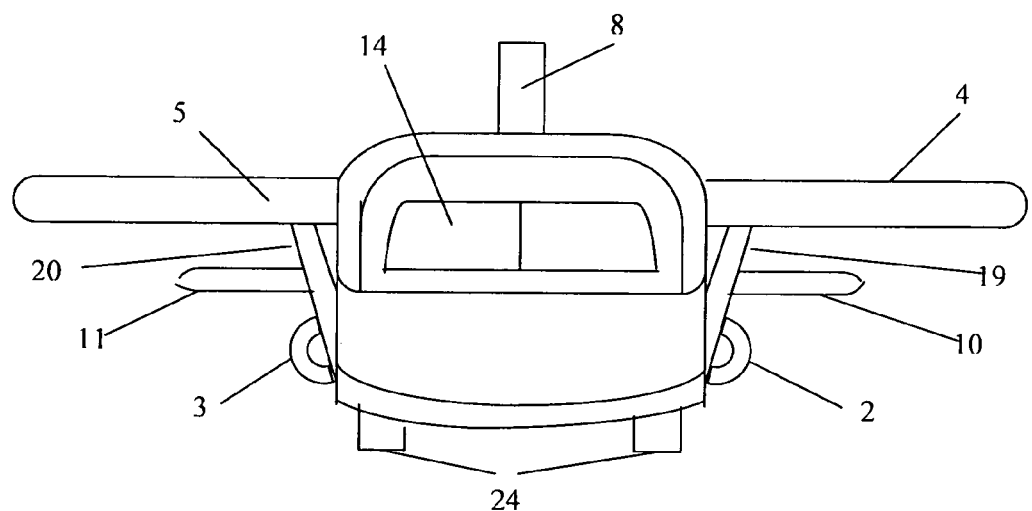
FIG. 3 is a view from the front in flight operation.
Figure 4:
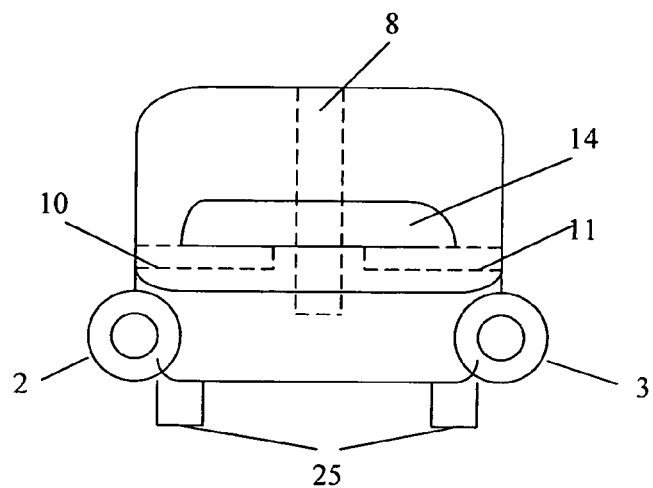
FIG. 4 is a view from the rear in road driving operation.

The drawings on FIGS. 3 and 4 show the front and rear views respectively for flying and driving configurations. A vertical stabilizer with rudder and two horizontal stabilizers with elevators on FIG. 4 are in stored positions.

Figure 5:
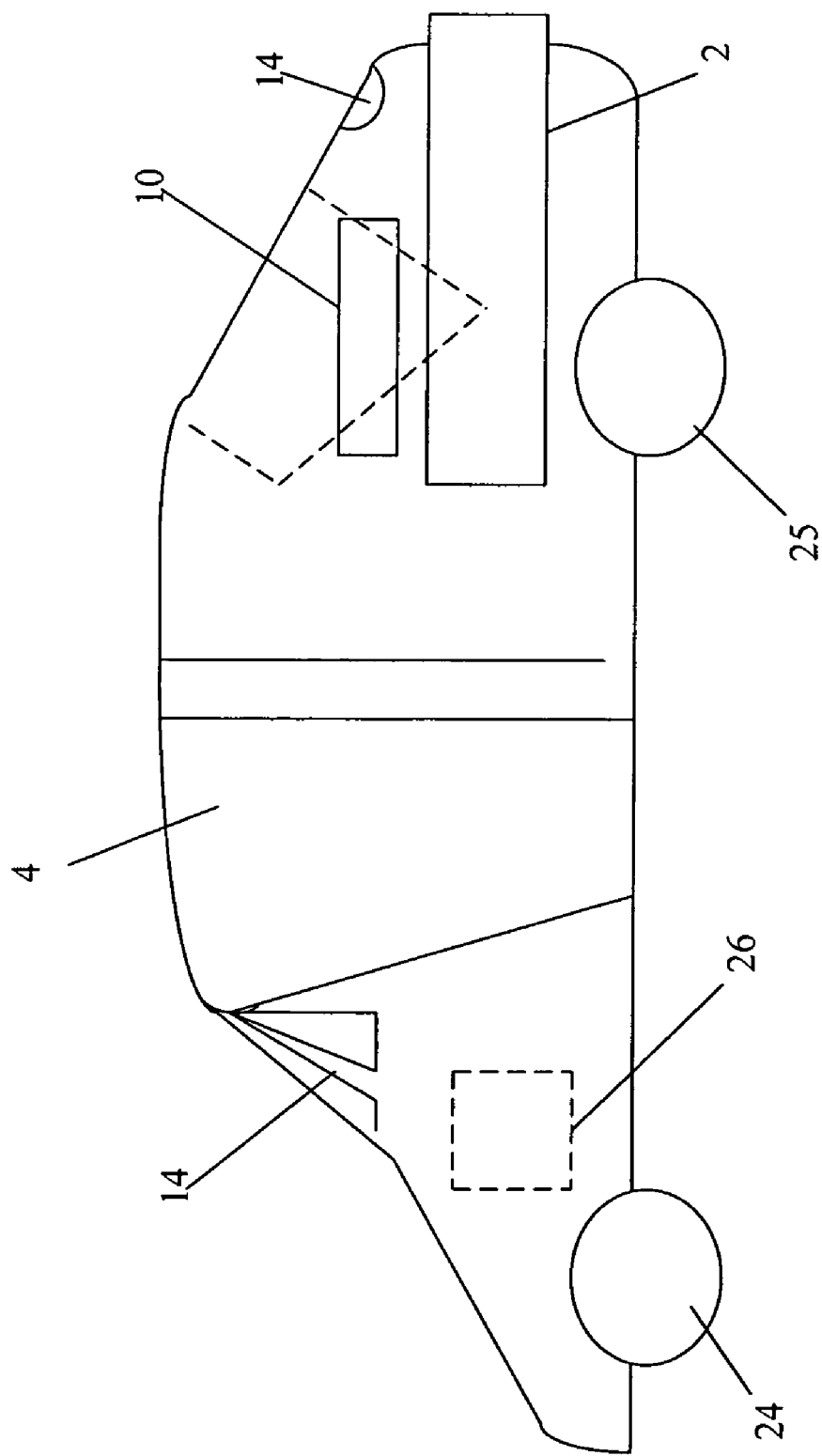
FIG. 5 is a view from the left side in road driving operation.

The drawings on FIG. 5 show the left side view for driving configuration. The additional elements on FIG. 5 comprise conventional engine with transmission 26 that drives the front wheels 24, while vertical and horizontal stabilizers are in a stored positions.

Figure 6:
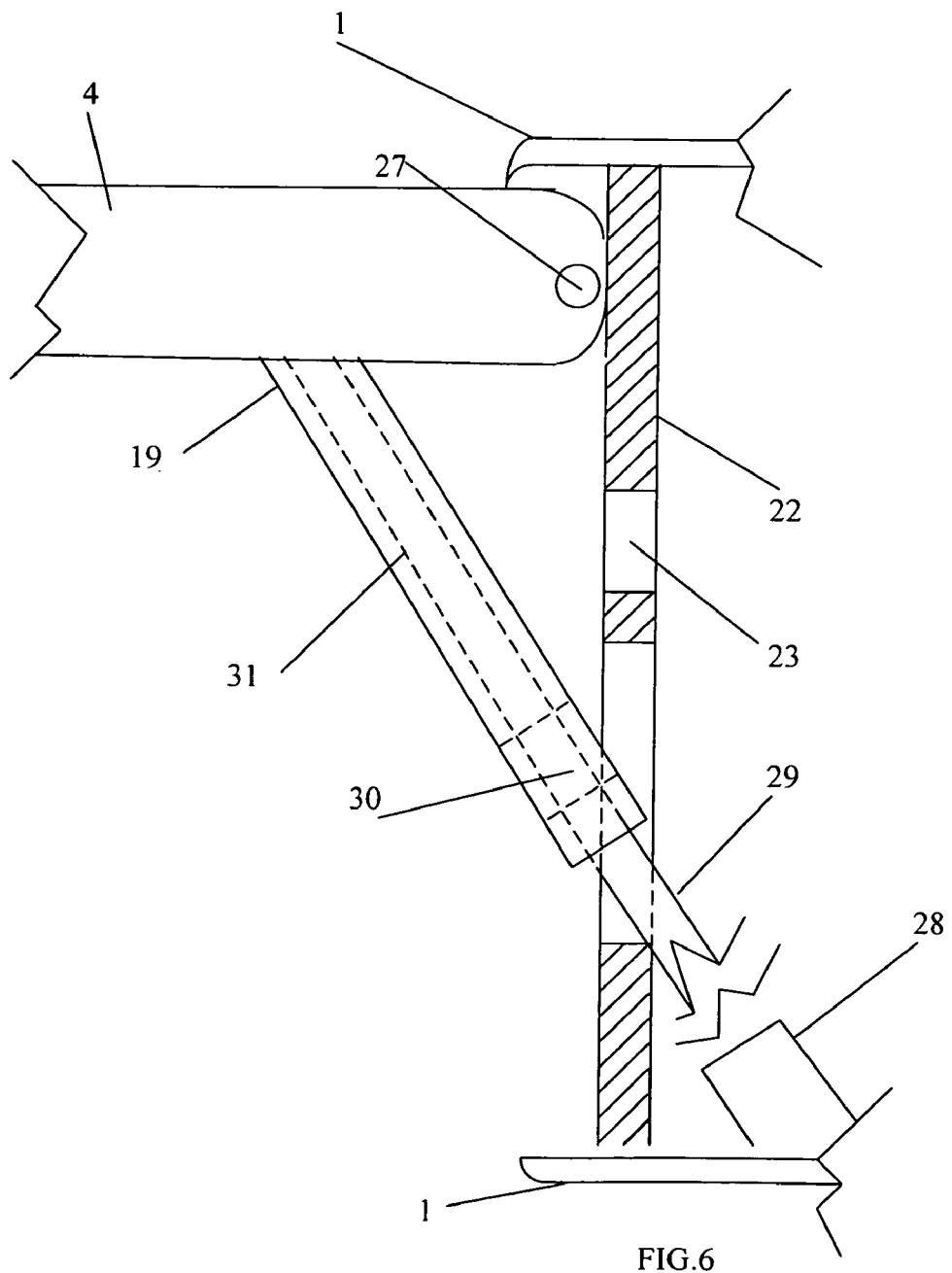
FIG. 6 is a sectional view from a rear of the left side in flight operation taken along lines 21-21 of the FIG. 1.
Figure 7:
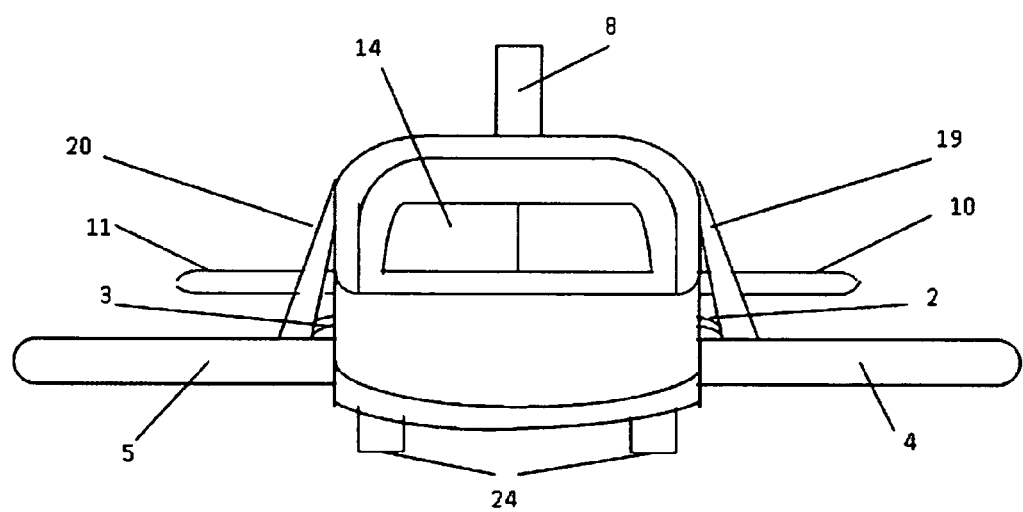
FIG. 7 is a view from the front in flight operation where wings-doors are opened downward.
Figure 8:
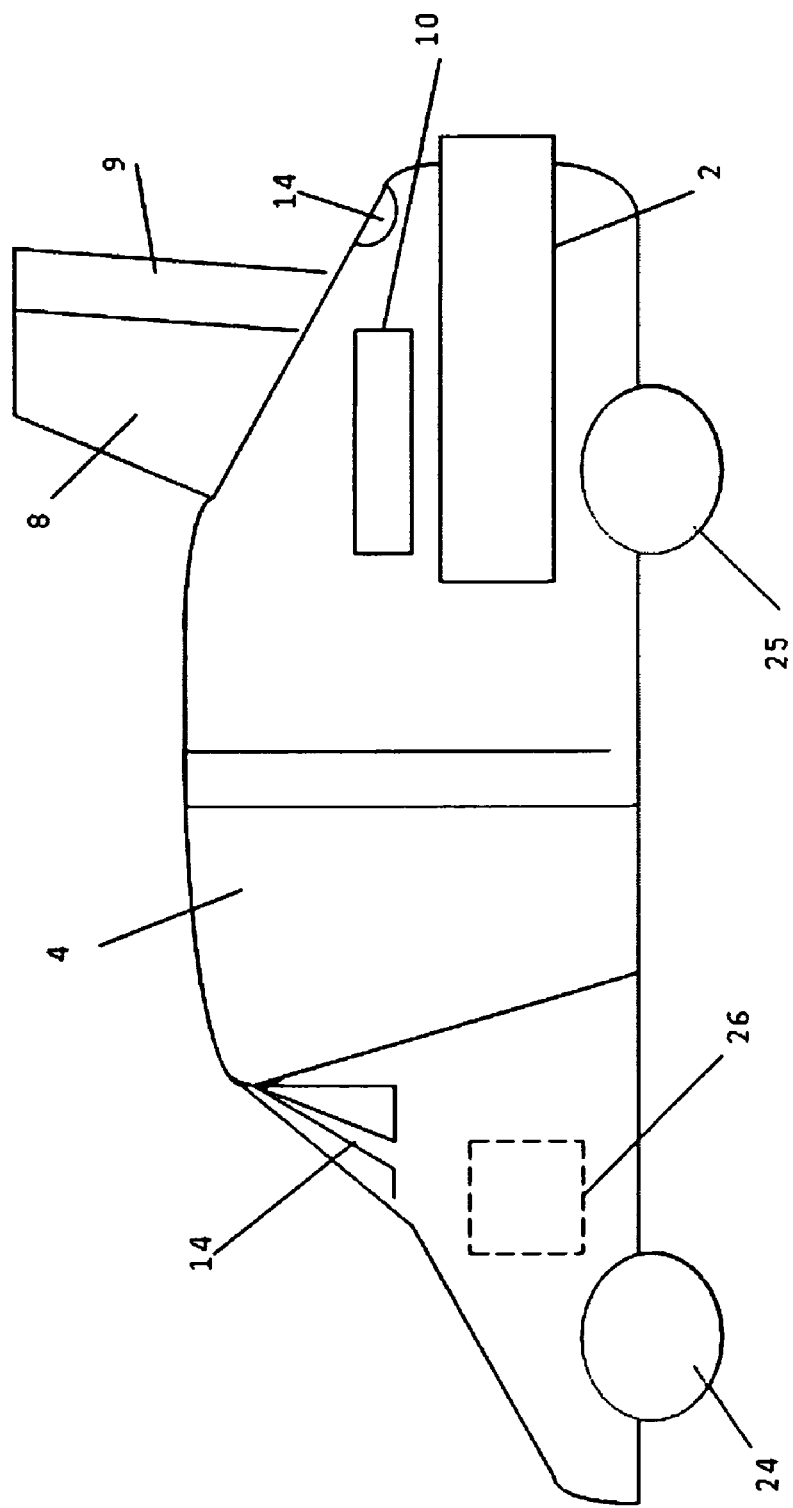
FIG. 8 is a view from the left side where the vertical stabilizer with rudder immovably affixed for road driving and flight operations.

The drawings on FIG. 6 show a cross section view from a rear of the left side along lines 21-21 of FIG. 1 for flying configuration arrangements. An assembly of the right wing-door is identical. The elements on FIG. 6 comprise of a left wing-door 4, left protective shield 22 with transparent part 23, left extendable shaft 19 and a left pin 27. Each shaft consists of electric drive 28, connected to a rod 29 that is rifled on its converse end 30, and section 30 is located within a piece of a pipe 31 which is rifled inside. An electric drive 28 rotates the rod 29 causing rifled section 30 to pivot inside the rifled piped piece 31, thrusting the piped piece 31 upward to raise the wing-door 4 for flight assembly. A left extendable shaft 19 will be locked/fixed through the pin 28 when the wing-door 4 reaches a horizontal position, which secures a wing-door 4 in flying configuration. A left extendable shaft is flexibly/rotary mounted to a wing-door on one end and to a body structure on the other end, which are not shown. A right extendable shaft is operated identically. A wing-door 4 is closing in the reverse order.

Two occupants can be located in a vehicle and a driver can automatically convert between road driving and flight configurations. On the road, a driver operates using the conventional engine. During the flight and take off driver operates with jet engines. The location of the jet engines at a body structure instead of in/inside body allows the engines to receive air intake directly without additional constructions, and those jet engines can be located at the doors that serve as wings in an alternate, as such configuration is well-known and common knowledge in the art. A protective shield can be arranged as an ordinary upward opening door or as a door construction with folding and unfolding parts. A speedy take off can be organized on special areas of highways or on special areas of roads.

Some constructional details are omitted because various realizations can be made by those skilled in the art without departing in any way from the spirit of the present invention.

Figure 9:
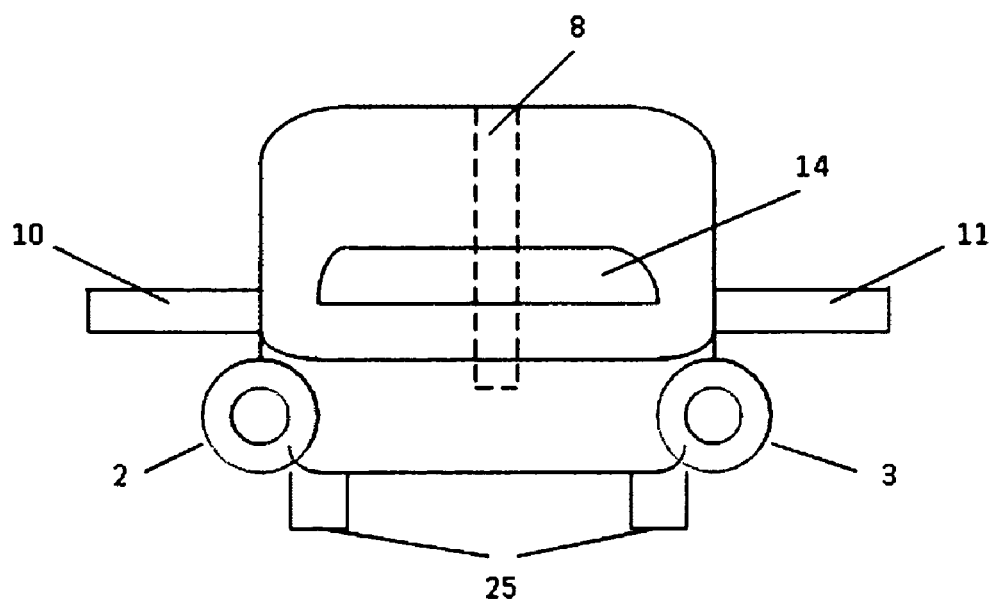
FIG. 9 is a view from the rear where horizontal stabilizers with elevators immovably affixed for road driving and flight operations.
Figure 10:
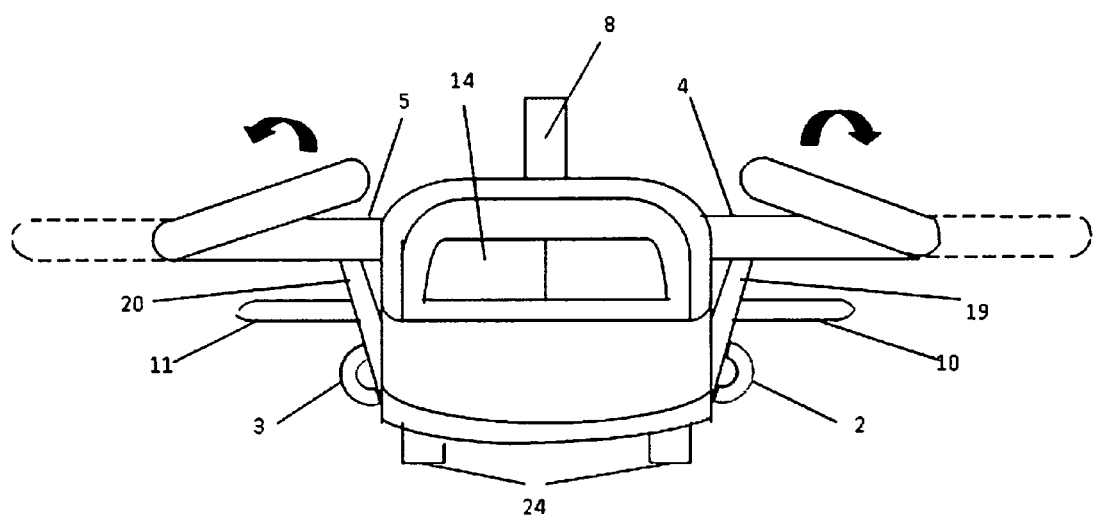
FIG. 10 is a view from the front for flight operation where wings-doors comprise of two sections.

Moreover, described invention should be taken as an example and numerous structural modifications and arrangements may be made without departing from the scope and idea of the invention as set forth in the claims. Various examples of structural modifications and arrangements are displayed in FIG. 7, FIG. 8, FIG. 9 and FIG. 10, whose description and drawings express their operations. In addition, it should be noted that FIG. 9 shows the vehicle in the road driving operations.

I claim:

1. A hybrid vehicle capable of flying and road driving operations comprising in combination:
   a body structure for carrying at least one person therein said body structure including at least two doors for road driving configuration, left and opposite right, which serve as wings and open upward for flying configuration with upper hinges positioned at said wings on said body structure;
   said body structure with a first power plant comprising a engine with transmission for driving operations installed in said body structure along with at least one second power plant comprising a jet engine for flight operations installed at said body structure;
   a vertical stabilizer with rudder affixed to a rear portion of said body structure for flight configuration which automatically stores into body for road driving operations;
   a left and opposite right horizontal stabilizer with elevators affixed to said rear portion of said body structure for flight configuration which automatically store into said body for road driving operations;
   a left and opposite right protective shield, which are installed in said body structure underneath said left and said opposite right door that serve as wings, and at least partly transparent for observations.

2. A hybrid vehicle capable of flying and road driving operations as set forth in claim 1, wherein said body structure for carrying at least one person therein said body structure including at least two doors for road driving configuration, left and opposite right, which serve as wings comprised of at least two sections connected one to another and to said body with hinging and locking means unfolding to extending positions of said wings for flight operations and folding of said wings for driving operations.

3. A hybrid vehicle capable of flying and road driving operations as set forth in claim 1, wherein said at least one second power plant comprises jet engines installed on said left and said opposite fight door that serve as wings for flight operations.

4. A hybrid vehicle capable of flying and road driving operations comprising in combination:
   a body structure for carrying at least one person therein said body structure including at least two doors for road driving configuration, left and opposite right, which serve as wings and open downward for flying configuration with bottom hinges positioned at said wings on said body structure;
   said body structure with a first power plant comprising a engine with transmission for driving operations installed in said body structure along with at least one second power plant comprising a jet engine for flight operations installed at said body structure;
   a vertical stabilizer with rudder affixed to a rear portion of said body structure for flight configuration which automatically stores into body for road driving operations;
   a left and opposite right horizontal stabilizer with elevators affixed to said rear portion of said body structure for flight configuration which automatically store into said body for road driving operations;
   a left and opposite right protective shield, which are installed in said body structure underneath said left and said opposite right door that serve as wings, and at least partly transparent for observations.

5. A hybrid vehicle capable of flying and road driving operations comprising in combination:
   a body structure for carrying at least one person therein said body structure including at least two doors for road driving configuration, left and opposite right, which serve as wings and open upward for flying configuration with upper hinges positioned at said wings on said body structure;
   said body structure with a first power plant comprising a engine with transmission for driving operations installed in said body structure along with at least one second power plant comprising a jet engine for flight operations installed at said body structure;

a vertical stabilizer with rudder immovably affixed to said rear portion of said body structure for road driving and flight operations;

a left and opposite right horizontal stabilizer with elevators affixed to said rear portion of said body structure for flight configuration which automatically store into said body for road driving operations;

a left and opposite right protective shield, which are installed in said body structure underneath said left and said opposite right door that serve as wings, and at least partly transparent for observations.

6. A hybrid vehicle capable of flying and road driving operations comprising in combination:

a body structure for carrying at least one person therein said body structure including at least two doors for road driving configuration, left and opposite right, which serve as wings and open upward for flying configuration with upper hinges positioned at said wings on said body structure;

said body structure with a first power plant comprising a engine with transmission for driving operations installed in said body structure along with at least one second power plant comprising a jet engine for flight operations installed at said body structure;

a vertical stabilizer with rudder affixed to a rear portion of said body structure for flight configuration which automatically stores into body for road driving operations;

a left and opposite right horizontal stabilizer with elevators immovably affixed to said rear portion of said body structure for road driving and flight operations;

a left and opposite right protective shield, which are installed in said body structure underneath said left and said opposite right door that serve as wings, and at least partly transparent for observations.

7. A hybrid vehicle capable of flying and road driving operations comprising in combination:

a body structure for carrying at least one person therein said body structure including at least two doors for road driving configuration, left and opposite right, which serve as wings and open upward for flying configuration with upper hinges positioned at said wings on said body structure;

said body structure with a first power plant comprising a engine with transmission for driving operations installed in said body structure along with at least one second power plant comprising a jet engine for flight operations installed at said body structure;

a vertical stabilizer with rudder affixed to a rear portion of said body structure for flight configuration which automatically stores into body for road driving operations;

a left and opposite right horizontal stabilizer with elevators affixed to said rear portion of said body structure for flight configuration automatically store at said body for road driving operations;

a left and opposite right protective shield, which are installed in said body structure underneath said left and said opposite right door that serve as wings, and at least partly transparent for observations.

* * * * *